United States Patent
Peng

(10) Patent No.: US 11,940,948 B2
(45) Date of Patent: Mar. 26, 2024

(54) ELECTRONIC DEVICE HAVING MULTIPLE PROCESSING UNITS AND MULTIPLE MEMORY UNITS, AND PROCESSING METHOD THEREOF

(71) Applicant: Lenovo (Beijing) Limited, Beijing (CN)

(72) Inventor: Jingang Peng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 93 days.

(21) Appl. No.: 17/688,515

(22) Filed: Mar. 7, 2022

(65) Prior Publication Data

US 2023/0093805 A1 Mar. 30, 2023

(30) Foreign Application Priority Data

Sep. 30, 2021 (CN) .......................... 202111163102.1

(51) Int. Cl.
*G06F 15/80* (2006.01)
*G06F 3/06* (2006.01)
*G06T 1/20* (2006.01)

(52) U.S. Cl.
CPC ........ *G06F 15/8061* (2013.01); *G06F 3/0653* (2013.01); *G06T 1/20* (2013.01)

(58) Field of Classification Search
CPC . G06T 1/20; G06T 1/60; G06F 1/1632; G06F 3/0653; G06F 15/167; G06F 15/8061

USPC ................................ 345/532, 533, 541, 542
See application file for complete search history.

(56) References Cited

U.S. PATENT DOCUMENTS

| | | | | |
|---|---|---|---|---|
| 5,335,322 A | * | 8/1994 | Mattison | G09G 5/39 345/542 |
| 5,790,138 A | * | 8/1998 | Hsu | G06F 15/17 345/542 |
| 6,434,688 B1 | * | 8/2002 | Rhoden | G06F 12/0223 345/503 |
| 2011/0264934 A1 | * | 10/2011 | Branover | G11C 5/148 713/320 |
| 2012/0324248 A1 | * | 12/2012 | Schluessler | G06F 1/329 713/300 |

* cited by examiner

*Primary Examiner* — Jacinta M Crawford
(74) *Attorney, Agent, or Firm* — ANOVA LAW GROUP, PLLC

(57) ABSTRACT

An electronic device includes a first processing unit and a second processing unit, a first memory unit correspondingly set for the first processing unit and configured for data access by the first processing unit, and a second memory unit correspondingly set for the second processing unit and configured for data access by the second processing unit. The first processing unit occupies at least part of storage space of the second memory unit when a first criteria is met, and/or the second processing unit occupies at least part of storage space of the first memory unit when a second criteria is met.

17 Claims, 10 Drawing Sheets

ELECTRONIC DEVICE HAVING MULTIPLE PROCESSING UNITS AND MULTIPLE MEMORY UNITS, AND PROCESSING METHOD THEREOF

CROSS-REFERENCE TO RELATED APPLICATION

This application claims priority to Chinese Patent Application No. 202111163102.1, filed on Sep. 30, 2021, the content of which is incorporated herein by reference in its entirety.

TECHNICAL FIELD

The present disclosure generally relates to the field of computer technology and, more particularly, to an electronic device and a processing method.

BACKGROUND

At present, slim electronic devices such as slim notebooks are very popular among users. Since these slim devices are thin and light, the design of device components will be limited to the device size, and thus it is required to ensure or improve device performance with as little space as possible. The applicant has found that the component design of current electronic devices, especially slim devices, is not optimized enough. Therefore, there is a need in the relevant fields to provide a device design solution that occupies less space while also ensuring/improving performance.

SUMMARY

In accordance with the present disclosure, there is provided an electronic device including a first processing unit and a second processing unit, a first memory unit correspondingly set for the first processing unit and configured for data access by the first processing unit, and a second memory unit correspondingly set for the second processing unit and configured for data access by the second processing unit. The first processing unit occupies at least part of storage space of the second memory unit when a first criteria is met, and/or the second processing unit occupies at least part of storage space of the first memory unit when a second criteria is met.

Also in accordance with the present disclosure, there is provided a processing method, applied to an electronic device. The electronic device includes a first processing unit and a second processing unit, and a first memory unit correspondingly set for the first processing unit and configured for data access by the first processing unit, and a second memory unit correspondingly set for the second processing unit and configured for data access by the second processing unit. The processing method includes, in response to the first processing unit satisfying a first criteria, the first processing unit occupying at least part of storage space of the second memory unit, and/or in response to the second processing unit satisfying a second criteria, the second processing unit occupying at least part of storage space of the first memory unit.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Hereinafter, embodiments consistent with the present disclosure will be described with reference to drawings. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

In the present disclosure, description with reference to the terms "one embodiment," "some embodiments," "example," "specific example," or "some examples," etc., mean specific features, structures, materials, or characters described in connection with the embodiment or example are included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first" and "second" are only used for descriptive purposes, and should not be understood as indicating or implying relative importance or implying the number of indicated technical features. Thus, a feature associated with "first," "second" may expressly or implicitly include at least one of that feature. In the description of the present disclosure, "plurality" means two or more, unless otherwise expressly and specifically defined.

In order to ensure/improve device performance as much as possible when there is limited space available, embodiments of the present disclosure provide an electronic device and a processing method, mainly by optimizing the design and access functions of memory units of different processing units (e.g., CPU, GPU) of the electronic device, to ensure/improve device performance with as little occupied space as possible.

The electronic device disclosed in the embodiments of the present disclosure may be a general-purpose device or a specialized device configured for specific environments or configurations. For example, the electronic device can be a personal computer, a server, a handheld device or portable device, a tablet, a multi-processing core device, etc. The solution of the present disclosure shows apparent advantages over other electronic devices, especially when the electronic device is a slim device, such as a laptop.

Figure 1:
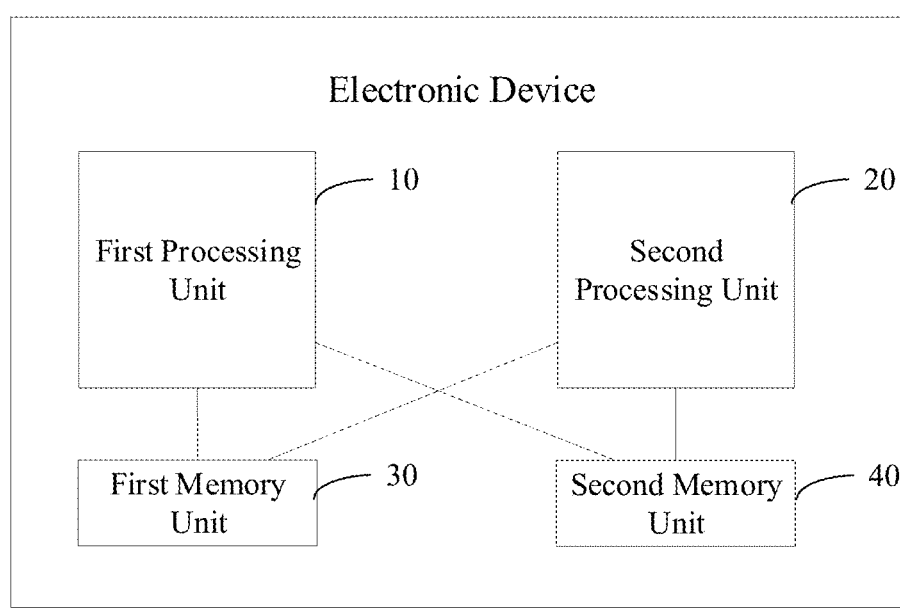
FIG. 1 illustrates a system architecture of an exemplary electronic device consistent with the present disclosure.

FIG. 1 illustrates a system architecture of an exemplary electronic device consistent with the present disclosure. Specifically, the exemplary electronic device includes a first processing unit 10 and a second processing unit 20, a first memory unit 30 corresponding to the first processing unit 10 and configured for data access by the first processing unit 10, a second memory unit 40 corresponding to the second processing unit 20 and configured for data access by the second processing unit 20. The first processing unit 10 uses at least part of the storage space of the second memory unit 40 when a first criteria is met, and/or the second processing unit 20 uses at least part of the storage space of the first memory unit 30 when a second criteria is met.

The first processing unit 10 may be a central processing unit (CPU), and the second processing unit 20 may be a graphics processing unit (GPU). Without limitation, the first processing unit 10 and the second processing unit 20 may also be different CPUs in an electronic device. In applications, the processing unit types of the first processing unit 10 and the second processing unit 20 may be flexibly set up according to actual needs.

When the first processing unit 10 and the second processing unit 20 are a CPU and a GPU respectively, the first memory unit 30 may be a main memory of the electronic device, and correspondingly the second memory unit 40 may be a video memory of the electronic device. In one embodiment, the main memory is a memory exclusively for the CPU, from/to which the CPU can read/write, and the video memory is a memory exclusively for the GPU, from/to which the GPU can read/write.

In one embodiment, the first processing unit 10 may occupy at least part of the storage space of the second memory unit 40 when a first criteria is met, and/or the second processing unit 20 may occupy at least part of the storage space of the first memory unit 30 when a second criteria is met. This allows an improvement of the data processing performance of the first processing unit 10 and/or the second processing unit 20 without adding additional physical memory units.

The first criteria may be a load condition indicating the corresponding load state/usage of the first processing unit 10/the first memory unit 30. For example, the first criteria may be that "the resource occupancy of the first processing unit reaches a certain threshold," which indicates that the first processing unit 10 is in a heavy load state. Similarly, the second criteria may be a load condition indicating the corresponding load state/usage of the second processing unit 20/the second memory unit 40. For example, the second criteria may be that "the resource occupancy of the second processing unit reaches a certain threshold," which indicates that the second processing unit 20 is in a heavy load state.

Without limitation, the first processing unit 10 occupying at least part of the storage space of the second memory unit 40 may mean that the first processing unit 10 occupies all or part of the storage space of the second memory unit 40. The second processing unit 20 occupying at least part of the storage space of the first memory unit 30 may mean that the second processing unit 20 occupies all or part of the storage space of the first memory unit 30.

In addition, the first processing unit 10 occupying at least part of the storage space of the second memory unit 40 when the first criteria is met may mean that the first processing unit 10 occupies the storage space of the first memory unit 30 and at least part of the storage space of the second memory unit 40 when the first criteria is met, or the first processing unit 10 just occupies at least part of the storage space of the second memory unit 40 when the first criteria is met, which is not limited by the present disclosure. Similarly, the second processing unit 20 occupying at least part of the storage space of the first memory unit 30 when the second criteria is met may mean that the second processing unit 20 occupies the storage space of the second memory unit 40 and at least part of the storage space of the first memory unit 30 when the second criteria is met, or the second processing unit 20 just occupies at least part of the storage space of the first memory unit 30 when the second criteria is met, which is not limited by the present disclosure either.

As can be seen from the above, in an electronic device disclosed in the present disclosure, the first processing unit of the electronic device is provided with a corresponding first memory unit for access by the first processing unit, and the second processing unit is provided with a corresponding second memory unit for access by the second processing unit. The first processing unit occupies at least part of the storage space of the second memory unit when the first criteria is met, and/or the second processing unit occupies at least part of the storage space of the first memory unit when the second criteria is met. In other words, the first processing unit and the second processing unit may not only use the memory units configured for themselves, but also use the memory units configured for other processing units if certain criteria is met. That is, the data processing performance of the processing units is improved without adding additional physical memory units. Accordingly, the objective of ensuring/improving the performance of the device with the minimized space occupation is achieved.

Figure 2:
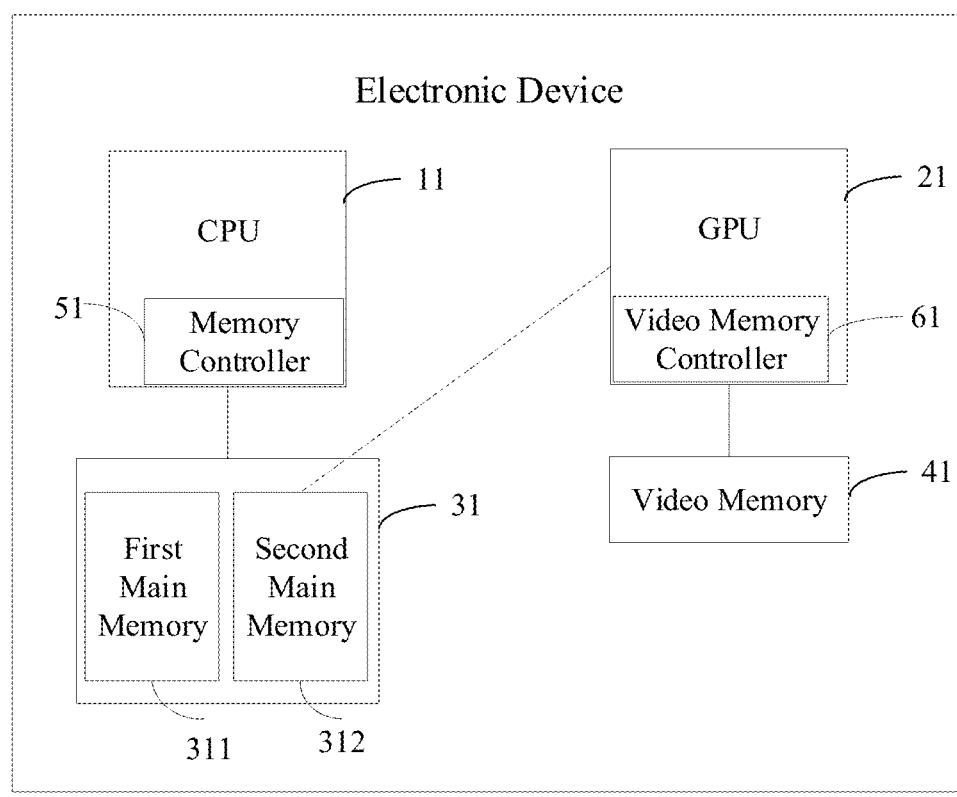
FIG. 2 illustrates a system architecture of an exemplary electronic device under an integrated video graphics card configuration consistent with the present disclosure.

Referring to a system architecture of an electronic device in FIG. 2, according to one embodiment, the first processing unit and the second processing unit of the electronic device are the CPU 11 and the GPU 21, respectively, and the first memory unit and the second memory unit are the main memory 31 and the video memory 41, respectively. The CPU and GPU are integrated into a single unit. That is, in the disclosed embodiment, the graphics card is designed according to an integrated graphics card configuration, and a new integrated graphics card-based architecture is adapted.

In the disclosed embodiment, the GPU is an integrated graphics processing unit (iGPU).

In the disclosed embodiment, through the configuration of the main memory of the electronic device, the iGPU may occupy part of the storage space of the main memory of the electronic device when the second criteria is met. Meanwhile, an external video memory may be configured for the iGPU, to improve the data processing performance of the iGPU.

Figure 3:
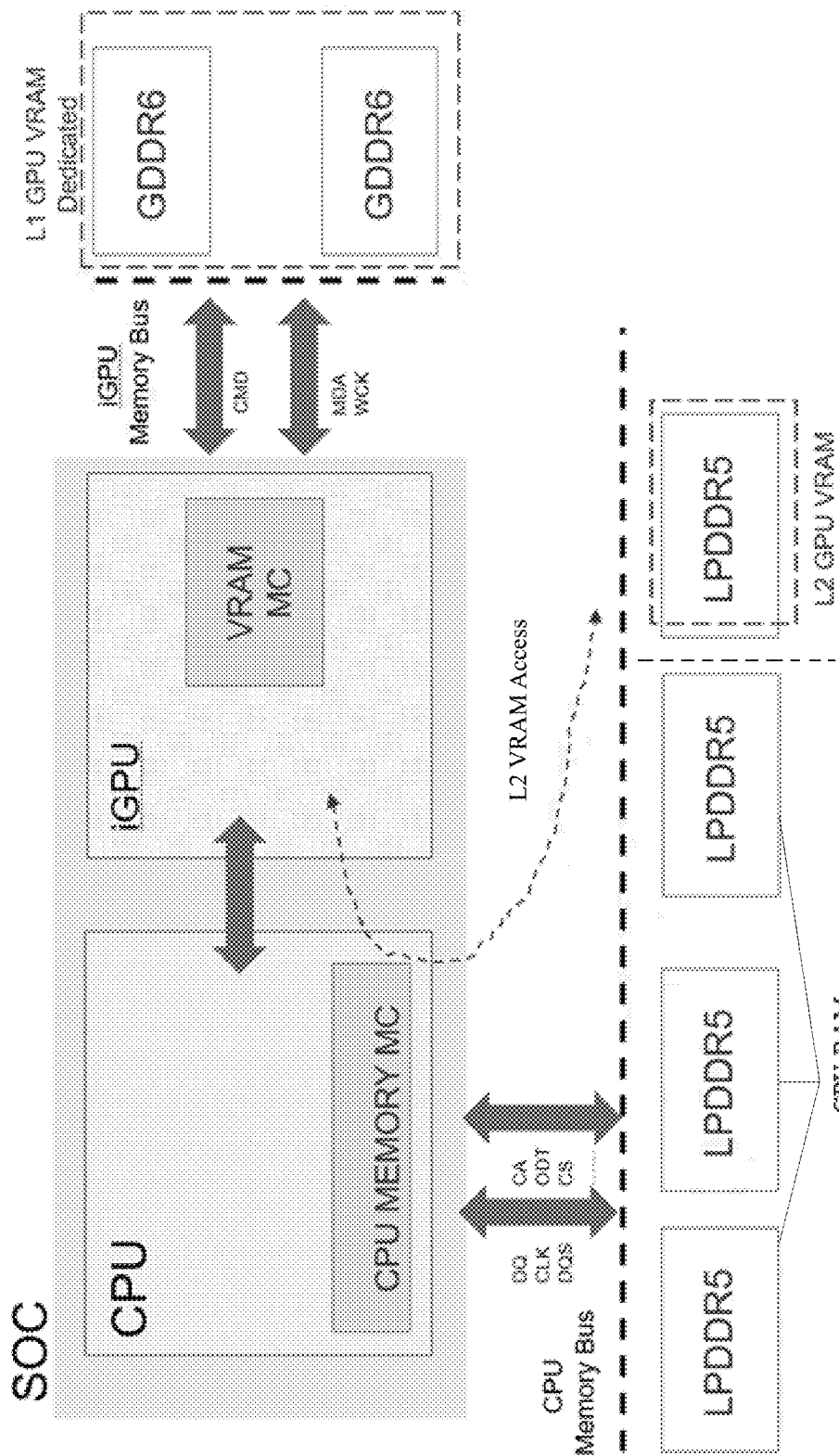
FIG. 3 illustrates an example of a system architecture of an electronic device under an integrated video graphics card configuration consistent with the present disclosure.

An exemplary integrated graphics card-based architecture is shown in FIG. 3. Specifically, in the exemplary integrated graphics card-based architecture, the CPU and the iGPU are configured on a same system-on-chip (SOC). Meanwhile, an external video memory is configured for the iGPU. In other words, the iGPU in the exemplary integrated graphics card-based architecture has an independent external video memory, which is different from other existing integrated graphics cards that share a memory with CPU and do not have an independent external video memory. For the specific external video memory, refer to L2 GPU VRAM (video RAM) in FIG. 3.

Referring back to FIG. 2, the main memory 31 of the electronic device can be further divided into a first main memory 311 for data access by the CPU and a second main memory 312 for data access by the iGPU, so that the second main memory may be occupied by the GPU when the second criteria is met.

The electronic device also includes a memory controller 51 configured inside the CPU (which refers to the whole CPU structure 11 but not just the CPU core itself) and a video memory controller 61 configured inside the iGPU (which refers to the whole GPU structure 21 but not just GPU core itself).

Specifically, the first main memory 311 is the CPU RAM and the second main memory 312 is the L2 GPU VRAM shown in FIG. 3. The memory controller 51 and the video memory controller 61 are respectively the CPU memory MC (memory controller) and the VRAM MC shown in FIG. 3. In this configuration, when the iGPU occupies the second main memory, the iGPU specifically accesses data in the second main memory through the memory controller. When the first processing unit accesses data in the main memory of the electronic device, the first processing unit specifically accesses data in the first main memory of the main memory through the memory controller. That is, in the disclosed embodiment, a part of the main memory (e.g., the second main memory) of the electronic device is assigned for use by the iGPU, while the remaining part (e.g., the first main memory) is still used by the CPU.

The memory volume of the second main memory can be greater than, smaller than, or equal to the memory volume of the video memory, which is not limited in the present disclosure. The second main memory and the video memory can be the same or different types of memory. If the memory types are the same, the memory controller and the video memory controller use the same access frequency to access the second main memory and the video memory, respectively. If the memory types are different, the memory controller and the video memory controller use different access frequencies to access the second main memory and the video memory, respectively.

In one embodiment, if the memory volume of the second main memory is smaller than the memory volume of the video memory and the access frequency of the second main memory is smaller than the access frequency of the video memory, the GPU mainly uses the video memory, and the second main memory is used as an auxiliary memory. Based on this principle, the memory usage of the GPU can be controlled according to a predetermined strategy, so that the GPU can use different memory access modes to access data in the corresponding portions of the video memory and the second main memory, respectively. For example:

11) If the GPU is in a first load state, the GPU accesses data in the second main memory through the memory controller.

12) If the GPU is in a second load state, the GPU accesses data in the video memory through the video memory controller.

13) If the GPU is in a third load state, the GPU accesses data in the video memory through the video memory controller, and accesses data in the second main memory through the memory controller.

Here, the load volume of the GPU in the first load state, second load state, and third load state is sequentially increased. For example, the first load state, the second load state, and the third load state may be light load state, heavy load state, and extremely heavy load state of the GPU, respectively.

Figure 4:
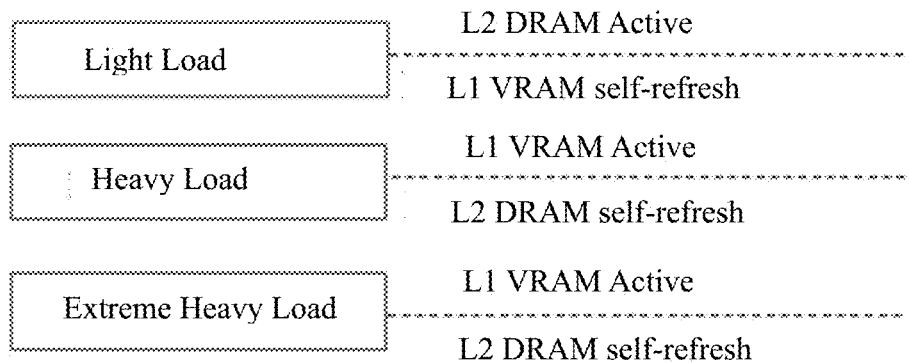
FIG. 4 illustrates an example of a memory access mode by a GPU under an integrated video graphics card configuration consistent with the present disclosure.

In the first load state such as the light load state, the GPU does not access the video memory. With respect to this scenario, referring to FIG. 4, the disclosed embodiment controls the video memory to be in a non-working state, e.g., control the video memory to enter the self-refresh mode, etc. In the second load state such as the heavy load state, the GPU does not access the second main memory. At this moment, the second main memory is similarly controlled to be in a non-working state. For example, the second main memory is controlled to enter the self-refresh mode, to save energy consumption and improve the battery life of the electronic device. In the third load state such as the extremely heavy load state, the data processing performance of the GPU is improved by making the GPU occupy both the video memory and the second main memory.

In one embodiment, by detecting the resource occupancy of the GPU, the current load state of the GPU can be determined according to a predefined relationship between the load states (e.g., light load, heavy load, extremely heavy load) and different occupancy intervals. The GPU then accesses data in the corresponding memory (e.g., the video memory and/or the second main memory) according to the memory access mode matching the current load state of the GPU.

Figure 5:
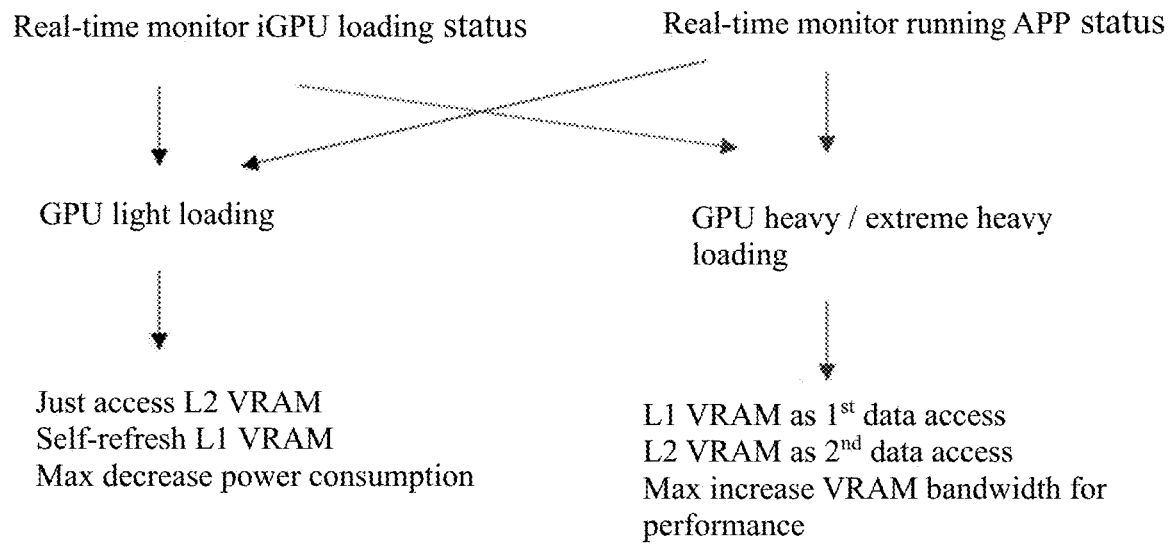
FIG. 5 illustrates a schematic diagram of monitoring GPU load state and accessing corresponding memory units in a corresponding memory access mode based on the GPU load state under an integrated video graphics card configuration consistent with the present disclosure.

In one embodiment, as shown in FIG. 5, the status (e.g., startup, running, and shutdown) of each application installed on an electronic device can be detected in real time. Each application in the electronic device in the running state can be also identified. According to the predetermined occupancy of the GPU resource (such as heavy GPU occupancy, light GPU occupancy) of each running application installed on the electronic device, it can be determined that the occupancy of the GPU resources of all running applications will lead the GPU to which load state. The GPU then accesses data in the corresponding memory (e.g., the video memory and/or the second main memory) according to the memory access mode matching the current load state.

In the disclosed embodiment, when the GPU, serving as the second processing unit, occupies at least part of the storage space of the first memory (e.g., the second main memory), the second criteria that needs to be met is a load condition, which includes: the GPU is in the above-described first load state, or the GPU is in the above-described third load state.

When the GPU is in the first load state, only the second main memory is used. When the GPU is in the third load state, both the video memory and the second main memory are used.

In the disclosed embodiment, the CPU and GPU are integrated into a single unit according to an integrated graphic card configuration. In addition, an external video memory is set up for the integrated GPU. This can make full use of the space advantage of the integrated graphic card as well as the performance advantage of independent external video memory (in the existing technologies, external video memory is only set up for an independent GPU). This greatly improves the performance of the integrated graphics card under the premise of saving space. In addition, based on the load state, the GPU can access the memory units in the external video memory and part of the main memory (e.g., second main memory) according to different memory access modes. This improves the performance of the integrated graphics card and also takes into consideration the battery life of the electronic device, thereby saving energy consumption and improving the battery life of the electronic device.

Further, another embodiment of the present disclosure provides a different integrated video graphics card configuration for the integrated graphics card. In the disclosed embodiment, the first processing unit and the second processing unit of the electronic device are also the CPU and the GPU respectively, such as the CPU 12 and the GPU 22 in FIG. 6. The first memory unit and the second memory unit are also the main memory and the video memory respectively, such as the main memory 32 and the video memory 42 in FIG. 6. In addition, the GPU and CPU in the electronic device are also integrated into a single unit.

In the disclosed embodiment, through the design of the main memory and the memory controller of the electronic device, the GPU can occupy part of the main memory of the electronic device when the second criteria is met. Meanwhile, an external video memory is set for the GPU in the integrated video graphics card configuration, so as to improve the data processing performance of the GPU in the integrated video graphics card configuration.

Figure 7:
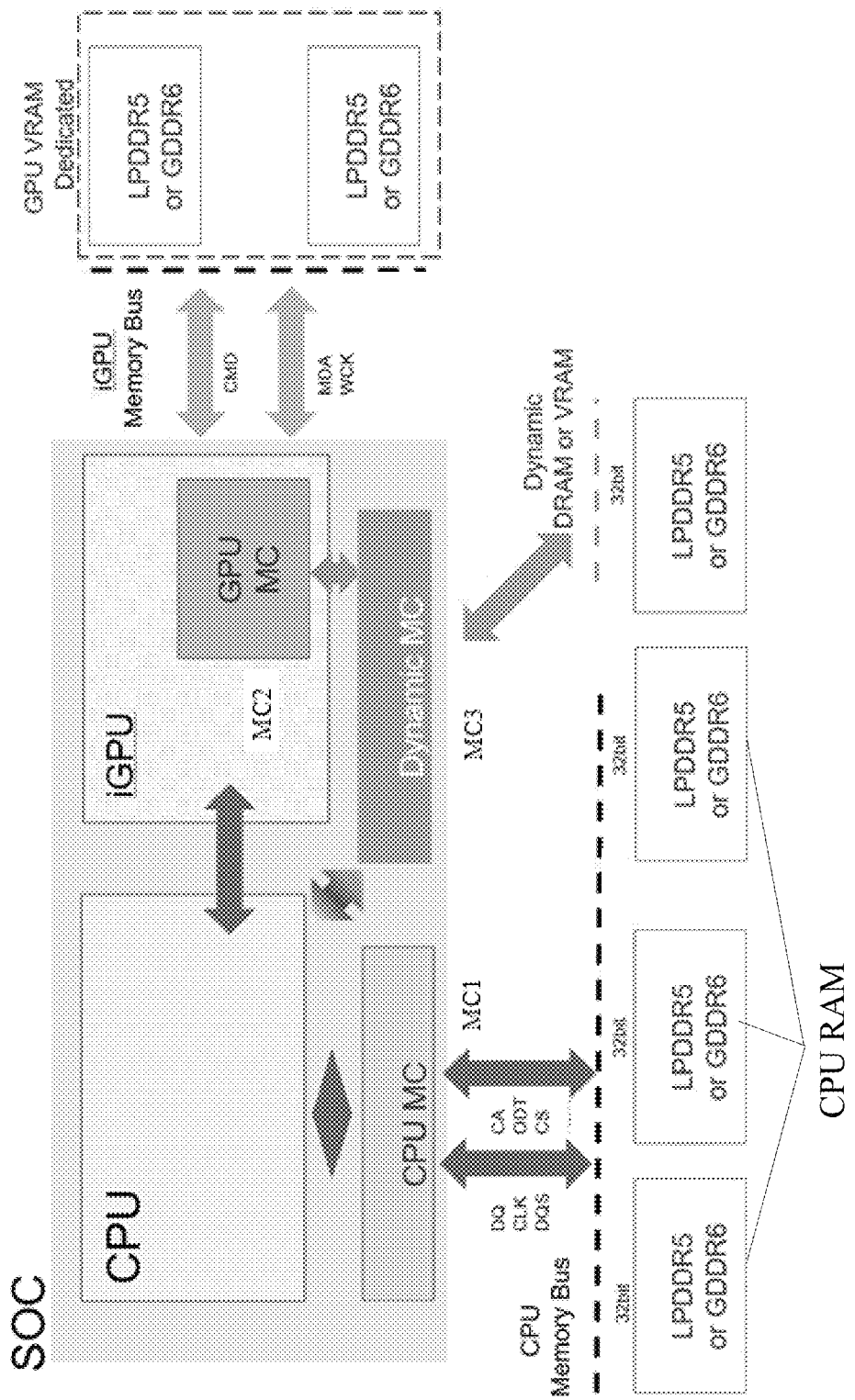
FIG. 7 illustrates an example of a system architecture of an electronic device under another integrated video graphics card configuration consistent with the present disclosure.

Taking the integrated video graphics card configuration illustrated in FIG. 7 as an example, in the disclosed integrated video graphics card configuration, the CPU and iGPU are also configured in a same SOC. Meanwhile, an external video memory is correspondingly set for the iGPU. That is, in the disclosed integrated video graphics card configuration, the iGPU also has an independent external video memory, specifically the GPU VRAM shown in FIG. 7.

In the disclosed embodiment, the main memory of the electronic device is further divided into a third main memory 321 for data access by the CPU and a fourth main memory 322 for data access by the iGPU. Specifically, the third main memory is the CPU RAM shown in FIG. 7, and the fourth main memory is the Dynamic DRAM or VRAM shown in FIG. 7.

Figure 6:
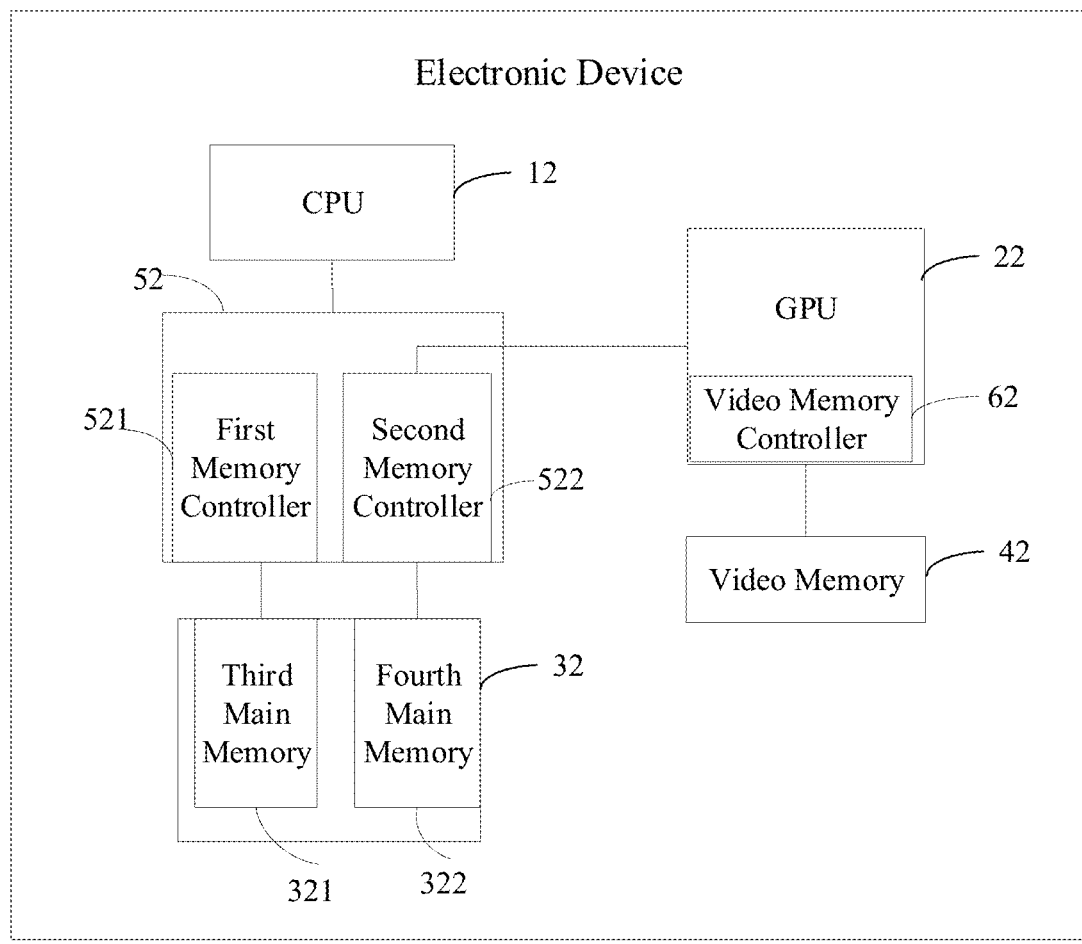
FIG. 6 illustrates a system architecture of an exemplary electronic device under another integrated video graphics card configuration consistent with the present disclosure.

The electronic device also includes a memory controller and a video memory controller, such as the memory controller 52 and the video memory controller 62 in FIG. 6, where the video memory controller is disposed inside the GPU. Different from the embodiment described earlier, the dedicated memory controller for the CPU disclosed here is set apart from the CPU itself and is placed outside the CPU. That is, in the disclosed embodiment, the memory controller is disposed outside the CPU. In addition, the memory controller disposed outside the CPU is further divided into a first memory controller 521 and a second memory controller 522. The first memory controller, the second memory controller, and the GPU memory controller are respectively shown in FIG. 7 as CPU MC (MC1), Dynamic MC (MC3), and GPU MC (MC2).

In one embodiment, when the second criteria is met, the GPU, serving as the second processing unit, occupies at least part of the storage space of the first memory unit, specifically the storage space of the fourth main memory. When the GPU occupies the fourth main memory, it may specifically means that the GPU accesses data in the fourth main memory through the second memory controller.

When the CPU accesses data in the first memory unit, it may specifically means that the CPU accesses data in the third main memory through the first memory controller, and/or the CPU accesses data in the fourth main memory through the second memory controller.

Different from the embodiment described earlier in which the second main memory divided from the main memory of the electronic device is dedicated for use by the GPU, in the disclosed embodiment, after the main memory of the electronic device is divided into the third main memory and the fourth main memory, the fourth main memory is dynamic and can be used by the CPU as well as the GPU. The second memory controller is correspondingly dynamic and can also be used by the CPU as well as the GPU. Which processing unit uses the fourth main memory/second memory controller at a specific time point is determined based on the actual load statuses of the CPU and the GPU.

The storage volume of the fourth main memory can be greater than, smaller than, or equal to the storage volume of the video memory, which is not limited by the present disclosure. The types of the fourth main memory and the video memory can be the same or different. When the types are the same, the second main memory controller and the video memory controller use the same access frequency to access the fourth main memory and video memory, respectively. When the types are different, the second memory controller and the video memory controller use different access frequencies to access the fourth main memory and video memory, respectively.

In the disclosed embodiment, the memory access modes of the GPU and CPU are controlled according to a predetermined strategy, so that the GPU can access data in the corresponding memory units (e.g., video memory and the fourth main memory) according to different access modes, and the CPU can access data in the corresponding memory units (e.g., the third main memory and the fourth main memory) according to different access modes.

Specifically, the memory access mode of the CPU can be controlled according to the following strategies, so that the CPU can access data in the corresponding third main memory and the fourth main memory, respectively, according to different memory access modes:

21) If the CPU is in the fourth load state, the CPU accesses data in the third main memory through the first memory controller.

22) If the CPU is in the fifth load state, the CPU accesses data in the third main memory through the first memory controller, and accesses data in the fourth main memory through the second memory controller.

Here, the load volume of the CPU in the fourth load state is smaller than that in the fifth load state. For example, the fourth load state and the fifth load state of the CPU may be the light load state and the heavy load state, respectively.

Meanwhile, the memory access mode of the GPU can be controlled according to the following strategies, so that the GPU can access data in the corresponding video memory and the fourth main memory respectively according to different memory access modes:

31) If the GPU is in the sixth load state, the GPU accesses data in the video memory through the video memory controller.

32) If the GPU is in the seventh load state, the GPU accesses data in the video memory through the video memory controller, and accesses data in the fourth main memory through the second memory controller.

Here, the load volume of the GPU in the sixth load state is smaller than the load volume in the seventh load state. For example, the sixth load state and the seventh load state of the GPU may be the light load state and heavy load state, respectively.

Figure 8:
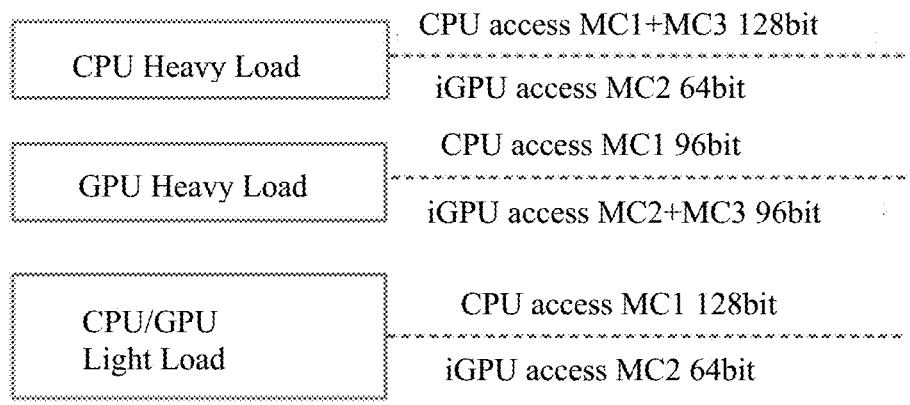
FIG. 8 illustrates an example of a memory access mode by a GPU/CPU under another integrated video graphics card configuration consistent with the present disclosure.

Based on the above memory access modes of the CPU and GPU, in the integrated video graphics card configuration of FIG. 7, the iGPU/CPU specifically access the memory units according to the following memory access modes, as shown in FIG. 8.

41) When the CPU is in a heavy load state, the CPU accesses the CPU RAM through MC1, and accesses Dynamic DRAM or VRAM through MC3. At this point, the Dynamic DRAM or VRAM is occupied by the CPU, and thus the GPU accesses the GPU VRAM through MC2.

42) When the GPU is in a heavy load state, the GPU accesses the GPU VRAM through MC2, and accesses Dynamic DRAM or VRAM through MC3. At this point, the Dynamic DRAM or VRAM is occupied by the GPU, and thus the CPU accesses the CPU RAM through MC1.

43) When the CPU is in a light load state, the CPU accesses the CPU RAM through MC1.

44) When the GPU is in a light load state, the GPU accesses the GPU VRAM through MC2.

It should be noted that if the CPU and GPU are in a heavy load state at the same time, it can be determined to which processing unit the fourth main memory (such as Dynamic DRAM or VRAM) should be allocated according to a further strategy. In one example, when all the processing units are in a heavy load state, the fourth main memory is directly allocated to the CPU, or the fourth main memory is allocated to a processing unit with a greater degree of load, etc.

In the disclosed embodiment, the resource occupancy of the GPU/CPU resources can be similarly detected, and the current load state of the GPU/CPU can be determined according to the predefined correspondences between different states (e.g., light load, heavy load) and the occupancy intervals. The GPU/CPU then accesses data in the corresponding memory units (e.g., video memory, third main memory, and fourth main memory) according to a memory access mode that matches the current load state.

Figure 9:
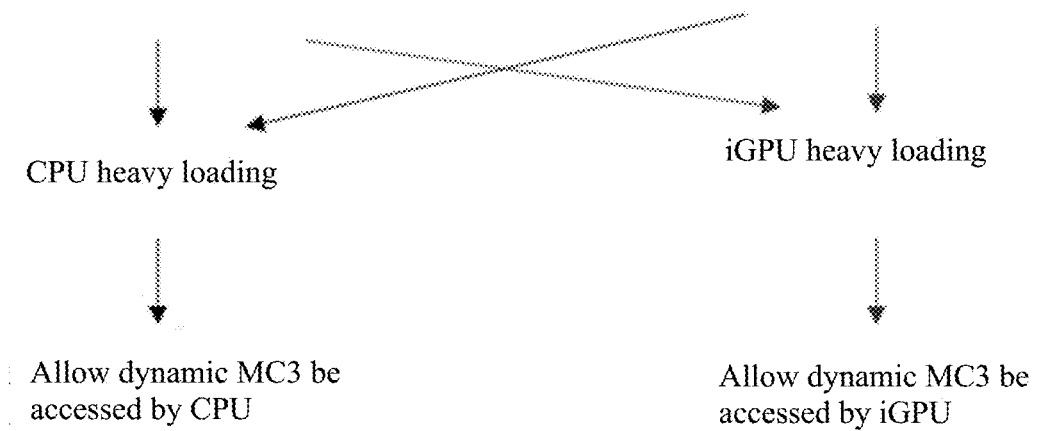
FIG. 9 illustrates a schematic diagram of monitoring GPU/CPU load state and accessing corresponding memory units in a corresponding memory access mode based on the GPU/CPU load state under another integrated video graphics card configuration consistent with the present disclosure.

Alternatively, according to another embodiment, the status (e.g., startup, running, and shutdown) of each application installed on the electronic device can be detected in real time, and each application in the running state in the electronic device can be identified, as shown in FIG. 9. Based on the predefined occupancy of the CPU/GPU resources (e.g., heavy GPU occupancy, light GPU occupancy) of each application installed on the electronic device when the application is running, it can be determined that the resource occupancy of the GPU/CPU caused by all the running applications will lead the CPU/GPU to which load state. The CPU/GPU then accesses data in the corresponding memory units (e.g., video memory, third main memory, fourth main memory) according to a memory access mode that matches the current load state.

In the disclosed embodiment, when the GPU, serving as the second processing unit, occupies at least part (e.g., fourth main memory) of the storage space of the first memory unit, the second criteria that needs to be met is a load condition, which may include that: the GPU is in the aforementioned seventh load state.

Here, when the GPU is in the seventh load state, the GPU specifically uses the video memory and the fourth main memory.

In the disclosed embodiment, the CPU and GPU are integrated into a single unit according to an integrated graphic card configuration. In addition, an external video memory is set up for the integrated GPU. This can make full use of the space advantage of the integrated graphic card as well as the performance advantage of independent external video memory (in the existing technologies, external video memory is only set up for an independent GPU). This greatly improves the performance of the integrated graphics card under the premise of saving space. In addition, based on the load state, the GPU can access the memory units in the external video memory and part of the main memory (e.g., fourth main memory) according to different memory access modes. This improves the performance of the integrated graphics card and also takes into consideration the battery life of the electronic device, thereby saving energy consumption and improving the battery life of the electronic device. In addition, in the disclosed embodiment, the fourth main memory is controlled to be in a dynamic mode, so that at a specific time point, based on the actual load state of the CPU and GPU, the fourth main memory can be used by the CPU or GPU. This further improves the flexibility of using memory units, and improves the processing performance of the CPU and GPU under the premise of a fixed number of memory units.

In one embodiment, the GPU and CPU in an electronic device are not integrated. That is, the disclosed embodiment adopts an independent video graphics card configuration to design the graphics card, and proposes a novel independent graphics card architecture. The GPU in the disclosed embodiment is correspondingly a discrete graphics processing unit (dGPU).

In the disclosed embodiment, the electronic device is divided into a unified memory access (UMA) mode and a dGPU mode. The UMA mode is a mode in which the system of the electronic device mainly uses the CPU functions and has an extremely high demand for main memory. For example, the running application(s) by a user requires an extremely high CPU performance in the UMA mode. The dGPU mode is a mode in which the system has certain requirements for the dGPU, and thus dGPU needs to run properly.

For the above two modes, the disclosed embodiment expands the system memory capacity in the UMA mode by redefining a CPU/dGPU architecture in combination with the hardware and software design of the system, to maximize the CPU performance.

Figure 10:
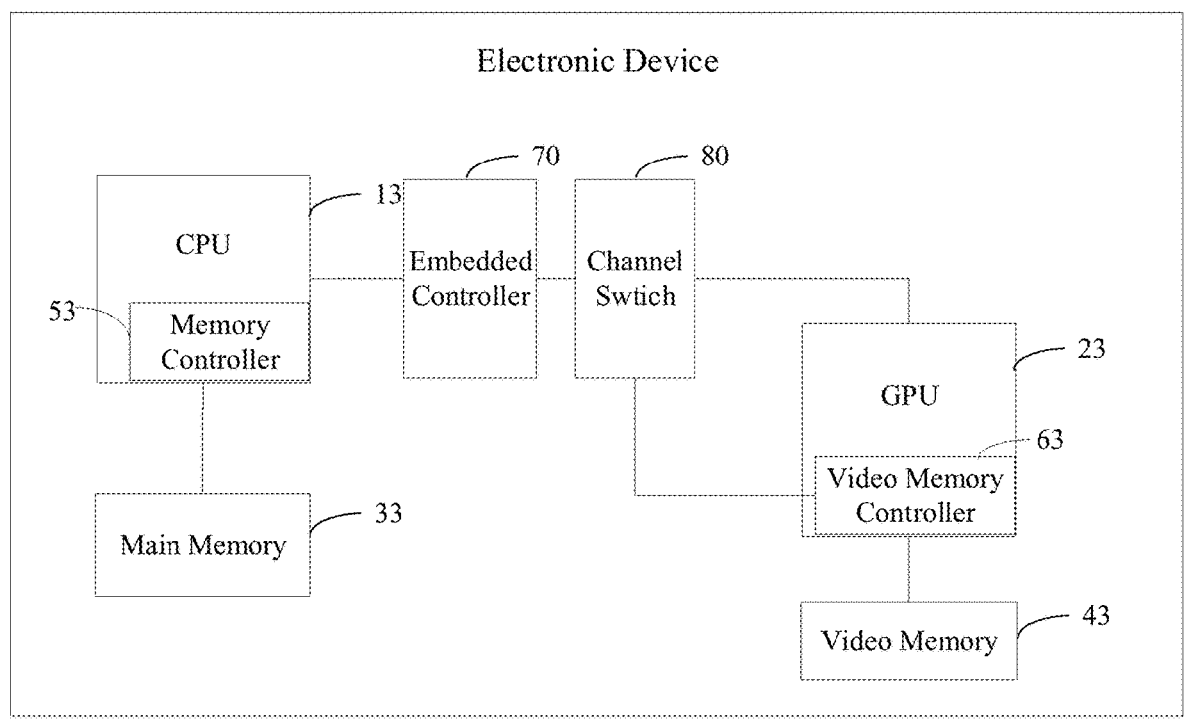
FIG. 10 illustrates a structural diagram of an electronic device based on a standalone display architecture consistent with the present disclosure.

In addition to the components shown in FIG. 1, such as the CPU and dGPU serving as the first processing unit and the second processing unit respectively, and the main memory and video memory serving as the first memory unit and the second memory unit respectively, the independent video graphics card configuration of the disclosed embodiment further includes a memory controller and a video memory controller. These specific components may refer to the CPU 13, GPU 23, main memory 33 and video memory 43, memory controller 53, and video memory controller 63 shown in FIG. 10.

The CPU can access data in the main memory through the memory controller, and the dGPU can access data in the video memory through the video memory controller. Referring to an exemplary independent video graphics card configuration of the disclosed embodiment provided in FIG. 11, the main memory and the video memory are CPU RAM and GPU VRAM respectively, and the memory controller and the video memory controller are CPU MC and dGPU MC respectively.

Figure 11:
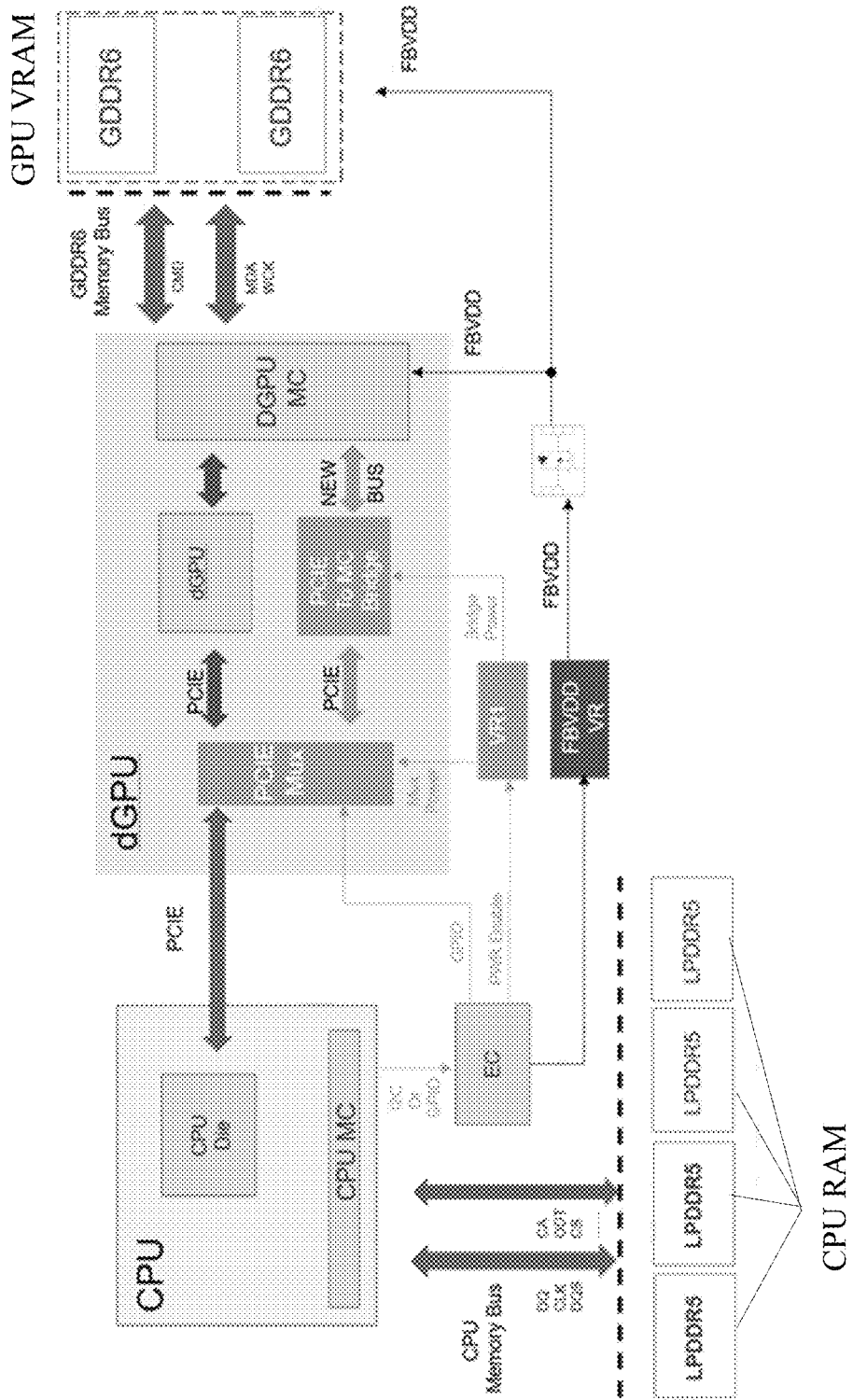
FIG. 11 illustrates an example of the system architecture of an electronic device under an independent video graphics card configuration consistent with the present disclosure.

In addition, in the disclosed embodiment, the electronic device further includes an embedded controller (EC) 70 and a channel switch 80, which are the EC and the PCIE Mux unit as shown in the exemplary independent video graphics card configuration in FIG. 11, respectively.

The embedded controller is connected with the CPU and the channel switch, and is connected to the video memory controller through the channel switch.

The channel switch is connected with the CPU, the GPU and the video memory controller, and is configured for channel switching between a first communication channel between the CPU and GPU and a second communication channel between the CPU and the video memory controller.

In a first mode, the embedded controller controls the first communication channel between the CPU and GPU to be turned on through the channel switch, and the second communication channel between the CPU and the video memory controller is turned off. In a second mode, the embedded controller controls the second communication channel between the CPU and the video memory controller to be turned on through the channel switch, and the first communication channel between the CPU and GPU is turned off.

The memory capacity requirement of the CPU in the first mode is smaller than the memory capacity requirement of the CPU in the second mode. The first mode may be specifically referred to as the dGPU mode, and the second mode may be specifically referred to as the UMA mode.

In the dGPU mode, the embedded controller controls the first communication channel to be turned on and the second communication channel to be turned off through the channel switch. The dGPU is in the normal working state, and accesses data in the video memory through the video memory controller. The CPU accesses the main memory through the memory controller. In the UMA mode, the embedded controller controls the second communication channel to be turned on and the first communication channel to be turned off through the channel switch. The dGPU is in a non-working state, the signal between the CPU and the video memory controller is turned on. The CPU can not only access the main memory through the memory controller, but also access the video memory through the video memory controller. In this mode, the main memory and the video memory of the system are used as the main memory and auxiliary memory of the CPU respectively, and thus the video memory is extended as a memory of the CPU.

In addition, the electronic device in the disclosed embodiment further includes a bridge component and two power supply units, specifically, the bridge component: PCIE to MC bridge, and the power supply units: VR1 and FBVDD VR shown in the exemplary independent video graphics card configuration in FIG. 11. The bridge component sits between the channel switch and the video memory controller and is configured to perform a signal conversion between the channel switch and the video memory controller. One of the two power supply units (e.g., VR1) is disposed between the embedded controller, the channel switch, and the bridge component, and is configured to provide power to the channel switch and the bridge component when the embedded controller is enabled. The other power supply unit (e.g., FBVDD VR) is disposed between the embedded controller, the video memory controller, and the video memory, and is configured to supply power to the video memory controller and video memory when the embedded controller is enabled.

According to the independent video graphics card configuration in the disclosed embodiment, when the system mainly uses CPU performance and has a high demand on the use of main memory, for example, when the application(s) running by a system user needs an extremely high CPU performance, the user can enter the BIOS (Basic Input Output System), set the system to the UMA mode through the BIOS. Alternatively, the system enters the BIOS and sets the system to the UMA mode through the BIOS based on an event that the monitored capacity usage of the main memory of the system reaches a predefined threshold required for entering into the UMA mode. After that, in the system boot stage, the BIOS notifies the EC (e.g., the CPU chip running the BIOS code notifies the EC) that the current mode of the system is the UMA mode. The EC responds to the notification information by enabling the power supply units of the channel switch and the bridge component to supply power to the channel switch and the bridge component, and by controlling the channel switch to switch from the first communication channel to the second communication channel through a signal form such as GPIO (General Purpose Input Output), so as to enable a switch from the dGPU mode to the UMA mode. In the UMA mode, the dGPU is in the off state (non-working state), and the communication between the CPU and the video memory controller is established, so that the CPU can not only access the main memory through the memory controller, but also access the video memory through the video memory controller, thereby allowing the expanded use of the video memory as a memory of the CPU.

Optionally, in the UMA mode, the system main memory and video memory are set as the main memory and auxiliary memory of the CPU respectively. The system of the device monitors the capacity usage of the main memory in real time. When the monitored capacity usage of the main memory exceeds a predefined threshold for initializing the auxiliary memory, the video memory is automatically enabled as the auxiliary memory and the CPU can access data in the video memory through the video memory controller, thereby allowing the expansion of the CPU memory capacity. The auxiliary memory is automatically turned off when the monitored usage of the memory units (e.g., main memory and video memory) is smaller than a predefined threshold required for disenabling the auxiliary memory.

When the monitored capacity usage of the main memory is smaller than a predefined threshold for ending the UMA mode, the BIOS notifies the EC of the mode information of the dGPU mode (e.g., the CPU chip running the BIOS code notifies the EC). The EC controls the switching of the channel switch from the second communication channel to the first communication channel by sending the GPIO and other signals. That is, the EC controls the second communication channel to be turned off and the first communication channel to be turned on, and turns off the power supply unit VR1 for providing power to the channel switch and the bridge component after the switching is completed.

It should be noted that, in applications, when switching to the UMA mode, it is not limited to the aforementioned implementation of controlling the dGPU to be in an off state (non-working state). In one embodiment, when the channel switch controls the second communication channel to be turned on, the first communication channel can also remain connected. The CPU can be controlled to occupy a part of the video memory through the video memory controller, and the remaining video memory space is still occupied by the dGPU. In the disclosed embodiment, when entering into the UMA mode that requires the video memory to be expanded as a memory for the CPU, the information such as the size or ratio of the expanded video memory can be notified to the video memory controller through the operating system (OS) or the BIOS. Based on the notification information, a certain size or proportion of the video memory space is expanded as the CPU memory for the CPU to use, and the remaining video memory space is still used by the dGPU.

That is, when the video memory is expanded as the CPU memory for the CPU to use, all or part of the video memory space can be expanded as the memory for the CPU, which is not limited in the present disclosure.

In the disclosed embodiment, when the CPU, serving as the first processing unit, occupies at least part of the space of the video memory, the first criteria to be met may refer to a load condition or a mode condition, where the load condition may specifically include: the resource utilization of the system main memory reaches a corresponding threshold that requires the video memory to be used, and the mode condition may specifically include: the electronic device is in the second mode (e.g., UMA mode).

The disclosed embodiment expands the memory capacity of the system in the UMA mode by redefining a CPU/dGPU architecture in the independent video graphics card configuration in combination with the hardware and software design of the system, which maximizes the performance of the CPU. The requirements for an extremely high CPU performance by a system can be met without the need to add additional physical memory units to the device.

Further, one embodiment of the present disclosure also provides a processing method, which is applicable to the electronic device provided by any of the above embodiments. The electronic device to which the method disclosed in the present disclosure is applicable, at least includes a first processing unit and a second processing unit, and a first memory unit corresponding to the first processing unit for data access by the first processing unit, and a second memory unit corresponding to the second processing unit for data access by the second processing unit.

Figure 12:
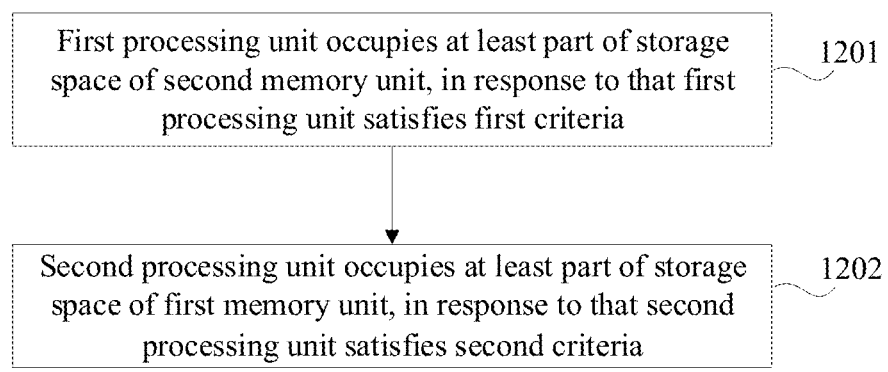
FIG. 12 illustrates a flowchart of an exemplary processing method consistent with the present disclosure.

Referring to a flowchart of s processing method provided in FIG. 12, the processing method in the disclosed embodiment includes any one or more of the following steps:

Step 1201: In response to the first processing unit satisfying the first criteria, the first processing unit occupies at least part of the storage space of the second memory unit.

Step 1202: In response to the second processing unit satisfying the second criteria, the second processing unit occupies at least part of the storage space of the first memory unit.

For example, the first processing unit and the second processing unit are the CPU and GPU of an electronic device, respectively, and the first memory unit and the second memory unit are the main memory and the video memory of the electronic device, respectively.

The method in the disclosed embodiment can be applied to an electronic device under any one of the two integrated video graphics card configurations and one independent video graphics card configuration provided in the above embodiments.

In one embodiment, for Step 1201, in response to the first processing unit satisfying the first criteria, the first processing unit occupying at least part of the storage space of the second memory unit may specifically include but is not limited to: for the aforementioned independent video graphics card configuration, when the CPU is in in the UMA mode, the CPU occupies all or part of the video memory. For Step 1202, in response to the second processing unit satisfying the second criteria, the second processing unit occupying at least part of the storage space of the first memory unit may specifically include but is not limited to: for the aforementioned two integrated video graphics card configurations, when the GPU is in the above described first load state, third load state or seventh load state, the GPU occupies part of the main memory.

Within the corresponding architectures, the first processing unit and the second processing unit can not only use the memory units provided for themselves, but also use the memory units of other processing units if certain criteria is met. For the specific processes, refer to the above described device embodiments, detail of which will not be repeated here.

As can be seen from the disclosed embodiments, in the electronic devices and processing methods disclosed in the present disclosure, a first processing unit of the electronic device is correspondingly provided with a first memory unit configured for access by the first processing unit, and a second processing unit of the electronic device is correspondingly provided with a second memory unit configured for access by the second processing unit. In addition, the first processing unit occupies at least part of the space of the second memory unit when a first criteria is met, and/or the second processing unit occupies at least part of the space of the first memory unit when the second criteria is met. In other words, the first processing unit and the second processing unit can not only use the memory units set for themselves, but also use the memory units set for other processing units under certain circumstances. The data processing performance of the processing units can thus be improved without adding additional physical memory units. The objective of ensuring/improving the performance of the electronic devices under the premise of as low space occupation as possible is then achieved.

In the present disclosure, the terms "comprising," "including" or any other variation thereof are intended to encompass a non-exclusive inclusion such that a process, method, article, or device comprising a list of elements includes not only those elements, but also others not expressly listed elements, or also include elements inherent to such a process, method, article or apparatus. Without further limitation, an element qualified by the phrase "comprising a . . . " does not preclude the presence of additional identical elements in a process, method, article, or apparatus that includes the element.

In the embodiments provided in the present disclosure, it should be understood that the disclosed system, device, and method may be implemented in other ways. For example, the device embodiments described above are only illustrative. For example, the division of the units is only a logical function division, and there may be other divisions in actual implementation. For example, multiple units or components may be combined or can be integrated into another system, or some features can be ignored or not implemented. In addition, the displayed or discussed mutual coupling or direct coupling or communication connection may be indirect coupling or communication connection through some interfaces, devices, or units, and may also be electrical, mechanical, or other forms of connection.

The units described as separate components may or may not be physically separated, and the components displayed as units may or may not be physical units, that is, they may be located in one place, or they may be distributed among multiple network units. Some or all of the units may be selected according to actual needs to achieve the objectives of the solutions of the embodiments of the present disclosure.

In addition, the functional units in the various embodiments of the present disclosure may be integrated into one processing unit, or each unit may exist alone physically, or two or more units may be integrated into one unit. The aforementioned integrated unit can be implemented in the form of a hardware or software functional unit.

A person of ordinary skill in the art can be aware that all or some of the processes in the method embodiments of the present disclosure can be implemented by hardware related to the program instructions. The program may be stored in a computer-readable storage medium. When the program is executed, the processes of the method embodiments may be executed. The aforementioned storage medium includes: a mobile storage medium, a read-only memory (ROM), a magnetic disk, an optical disk, or another medium that can store program codes.

When the integrated unit is implemented in the form of a software functional unit and sold or used as an independent product, it can be stored in a computer-readable storage medium. Based on this understanding, all or part of the technical solution can be embodied in the form of a software product. The computer software product is stored in a storage medium, and includes several instructions to enable a computer device (which may be a personal computer, a server, or a network device, etc.) to perform all or some of the processes of the method described in each embodiment of the present disclosure. The aforementioned storage medium includes: a mobile storage medium, a read-only memory (ROM), a magnetic disk, an optical disk, or another medium that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An electronic device, comprising:
a first processing unit and a second processing unit;
a first memory unit correspondingly set for the first processing unit and configured for data access by the first processing unit, the first memory unit including a first main memory and a second main memory;
a second memory unit correspondingly set for the second processing unit and configured for data access by the second processing unit;
a first memory controller; and
a second memory controller,
wherein:
the first processing unit is configured to:
when accessing data in the first memory unit, access data in the first main memory through the first memory controller and/or access data in the second main memory through the second memory controller; and
occupy at least part of storage space of the second memory unit when a first criteria is met; and/or
the second processing unit is configured to occupy at least part of storage space of the first memory unit when a second criteria is met, including accessing data in the second main memory through the second memory controller when a load condition is met.

2. The electronic device according to claim 1, wherein the first processing unit is a central processing unit (CPU), the second processing unit is a graphics processing unit (GPU), the first memory unit is a main memory of the electronic device including the first main memory and the second main memory, and the second memory unit is a video memory of the electronic device.

3. The electronic device according to claim 2, wherein:
the GPU and CPU are integrated into a single unit, and the electronic device further comprises a video memory controller.

4. The electronic device according to claim 3, wherein, when the GPU accesses data in the video memory and/or accesses data in the second main memory, the GPU is configured to:
access data in the second main memory through the second memory controller if the GPU is in a first load state;
access data in the video memory through the video memory controller if the GPU is in a second load state; and
access data in the video memory through the video memory controller and access data in the second main memory through the second memory controller if the GPU is in a third load state,
wherein, a load volume of the GPU in the first load state, the second load state, and the third load state is sequentially increased, and the load condition includes that the GPU is in the first load state or the third load state.

5. The electronic device according to claim 3, wherein, when the CPU accesses data in the first main memory through the first memory controller and/or accesses data in the second main memory through the second memory controller, the CPU is configured to:
access data in the first main memory through the first memory controller if the CPU is in a fourth load state; and
access data in the first main memory through the first memory controller, and access data in the second main memory through the second memory controller if the CPU is in a fifth load state,
wherein a load volume of the CPU in the fourth load state is smaller than a load volume of the CPU in the fifth load state.

6. The electronic device according to claim 3, wherein, when the GPU accesses data in the video memory and/or accesses data in the second main memory, the GPU is configured to:
access data in the video memory through the video memory controller if the GPU is in a sixth load state; and
access data in the video memory through the video memory controller and access data in the second main memory through the second memory controller if the GPU is in a seventh load state,
wherein a load volume of the GPU in the sixth load state is smaller than a load volume of the GPU in the seventh load state, and the load condition includes that the GPU is in the seventh load state.

7. The electronic device according to claim 2, wherein the GPU and CPU are not integrated, the electronic device further comprises a memory controller including the first memory controller and the second memory controller, a video memory controller, an embedded controller, and a channel switch, and the first criteria includes that the electronic device is in a second mode;
    wherein the embedded controller is connected to the CPU and the channel switch and is connected to the video memory controller through the channel switch, and the channel switch is connected to the CPU, the GPU, and the video memory controller and is configured for a channel switch between a first communication channel between the CPU and GPU and a second communication channel between the CPU and the video memory controller; and
    in a first mode, the embedded controller controls the first communication channel to be turned on and the second communication channel to be turned off through the channel switch, and in the second mode, the embedded controller controls the second communication channel to be turned on and the first communication channel to be turned off through the channel switch,
    wherein a memory capacity requirement of the CPU in the first mode is smaller than a memory capacity requirement of the CPU in the second mode.

8. The electronic device according to claim 7, wherein,
when the CPU accesses data in the main memory and/or accesses data in the video memory, the CPU is configured to:
when in the first mode, access data in the main memory through the memory controller, and
when in the second mode, access data in the main memory through the memory controller, and access data in the video memory through the video memory controller; and
when the GPU accesses data in the video memory, the GPU is configured to:
    when in the first mode, access data in the video memory through the video memory controller, and
    when in the second mode, the GPU is in an inactive state.

9. A processing method, applied to an electronic device, the electronic device comprising a first processing unit and a second processing unit, a first memory unit correspondingly set for the first processing unit and configured for data access by the first processing unit and including a first main memory and a second main memory, a second memory unit correspondingly set for the second processing unit and configured for data access by the second processing unit, a first memory controller, and a second memory controller, the method comprising:
    when accessing data in the first memory unit, the first processing unit accessing data in the first main memory through the first memory controller and/or accessing data in the second main memory through the second memory controller;
    in response to the first processing unit satisfying a first criteria, the first processing unit occupying at least part of storage space of the second memory unit; and/or in response to the second processing unit satisfying a second criteria, the second processing unit occupying at least part of storage space of the first memory unit, including accessing data in the second main memory through the second memory controller when a load condition is met.

10. The processing method according to claim 9, wherein the first processing unit is a central processing unit (CPU), the second processing unit is a graphics processing unit (GPU), the first memory unit is a main memory of the electronic device including the first main memory and the second main memory, and the second memory unit is a video memory of the electronic device.

11. The processing method according to claim 10, wherein the GPU and CPU are integrated into a single unit, and the electronic device further comprises a video memory controller.

12. The processing method according to claim 11, wherein the GPU accessing data in the video memory and/or accessing data in the second main memory further comprise:
    the GPU accessing data in the second main memory through the second memory controller if the GPU is in a first load state;
    the GPU accessing data in the video memory through the video memory controller if the GPU is in a second load state; and
    the GPU accessing data in the video memory through the video memory controller and accessing data in the second main memory through the second memory controller if the GPU is in a third load state,
    wherein, a load volume of the GPU in the first load state, the second load state, and the third load state is sequentially increased, and the load condition includes that the GPU is in the first load state or the third load state.

13. The processing method according to claim 11, wherein the CPU accessing data in the first main memory through the first memory controller, and/or accessing data in the second main memory through the second memory controller further comprise:
    the CPU accessing data in the first main memory through the first memory controller if the CPU is in a fourth load state; and
    the CPU accessing data in the first main memory through the first memory controller, and accessing data in the second main memory through the second memory controller if the CPU is in a fifth load state,
    wherein a load volume of the CPU in the fourth load state is smaller than a load volume of the CPU in the fifth load state.

14. The processing method according to claim 11, wherein the GPU accessing data in the video memory and/or accessing data in the second main memory further comprise:
    the GPU accessing data in the video memory through the video memory controller if the GPU is in a sixth load state; and
    the GPU accessing data in the video memory through the video memory controller and accessing data in the second main memory through the second memory controller if the GPU is in a seventh load state,
    wherein a load volume of the GPU in the sixth load state is smaller than a load volume of the GPU in the seventh load state, and the load condition includes that the GPU is in the seventh load state.

15. The processing method according to claim 10, wherein the GPU and CPU are not integrated, the electronic device further comprises a memory controller including the first memory controller and the second memory controller, a video memory controller, an embedded controller, and a channel switch, and the first criteria includes that the electronic device is in a second mode; and
    wherein the embedded controller is connected to the CPU and the channel switch and is connected to the video memory controller through the channel switch, and the channel switch is connected to the CPU, the GPU, and the video memory controller and is configured for a channel switch between a first communication channel between the CPU and GPU and a second communication channel between the CPU and the video memory controller, and the method further comprises:

in a first mode, the embedded controller controlling the first communication channel to be turned on and the second communication channel to be turned off through the channel switch, and in the second mode, the embedded controller controlling the second communication channel to be turned on and the first communication channel to be turned off through the channel switch, wherein a memory capacity requirement of the CPU in the first mode is smaller than a memory capacity requirement of the CPU in the second mode.

16. The processing method according to claim 15, wherein the CPU accessing data in the main memory and/or accessing data in the video memory further comprises:

when in the first mode, the CPU accessing data in the main memory through the memory controller, and when in the second mode, the CPU accessing data in the main memory through the memory controller, and accessing data in the video memory through the video memory controller; and wherein the GPU accessing data in the video memory further comprises:

when in the first mode, the GPU accessing data in the video memory through the video memory controller, and when in the second mode, the GPU being in an inactive state.

17. An electronic device, comprising:

a first processing unit and a second processing unit;

a first memory unit correspondingly set for the first processing unit and configured for data access by the first processing unit, the first memory unit including a first main memory and a second main memory;

a second memory unit correspondingly set for the second processing unit and configured for data access by the second processing unit;

a first controller; and a second controller, wherein:

the first processing unit is configured to occupy at least part of storage space of the second memory unit when a first criteria is met; and/or the second processing unit is configured to:

access data in the second main memory through the first controller if the second processing unit is in a first load state;

access data in the second memory unit through the second controller if the second processing unit is in a second load state; and access data in the second memory unit through the second controller and access data in the second main memory through the first controller if the second processing unit is in a third load state, a load volume of the second processing unit in the first load state, the second load state, and the third load state being sequentially increased.

* * * * *